United States Patent
Matsuyama

(10) Patent No.: US 7,412,696 B2
(45) Date of Patent: Aug. 12, 2008

(54) METHOD, APPARATUS AND COMPUTER PROGRAM FOR COMPILING PROGRAM USING STATISTICAL INFORMATION ON VARIABLES, AND RECORDING MEDIUM THEREFOR

(75) Inventor: Manabu Matsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 677 days.

(21) Appl. No.: 10/811,716

(22) Filed: Mar. 29, 2004

(65) Prior Publication Data

US 2005/0050532 A1 Mar. 3, 2005

(30) Foreign Application Priority Data

Aug. 26, 2003 (JP) .............................. 2003-301039

(51) Int. Cl.
G06F 9/44 (2006.01)
G06F 9/45 (2006.01)

(52) U.S. Cl. ..................... 717/137; 717/107; 717/108; 717/114; 717/130; 717/136; 717/158

(58) Field of Classification Search ................. None
See application file for complete search history.

(56) References Cited

U.S. PATENT DOCUMENTS 5,752,035 A * 5/1998 Trimberger ................. 717/153
5,815,720 A * 9/1998 Buzbee ....................... 717/158

FOREIGN PATENT DOCUMENTS

JP 11-149380 6/1999

* cited by examiner

Primary Examiner—Chuck O Kendall
(74) Attorney, Agent, or Firm—Greer, Burns & Crain, Ltd.

(57) ABSTRACT

The apparatus according to the present invention adds a sequence of instructions for recording a maximum of two sets of values assigned to variables in the procedure under the first execution and whose appearance frequencies can reach 50% or more and their appearance frequencies to the intermediate data of a source program to obtain primary profile information after the end of a first execution. Further it adds another sequence of instructions for recording the appearance frequencies of the values of the primary profile information and the execution frequency of the procedure to the intermediate data to obtain final profile information after the end of a second execution. Then, it calculates a value whose appearance frequency with respect to a variable is 50% or more on the basis of the final profile information to optimize the procedure regarding this value and thereby generate an object program.

6 Claims, 6 Drawing Sheets

```
struct prof_record {
    int bb_id;       /* UNIQUE NUMBER ASSIGNED BY
                        COMPILER TO BASIC BLOCK */
    int bb_count;    /* COUNTER OF BASIC BLOCK EXECUTIONS */
    int var_id;      /* UNIQUE NUMBER ASSIGNED BY COMPILER
                        TO VARIABLE */
    struct {         /* VALUE LIST */
        int val;     /* VALUE ASSIGNED TO VARIABLE UPON
                        EXECUTION */
        int count;   /* NUMBER OF TIMES VALUE IS GIVEN */
    } array [2]      /* NUMBEROF VALUE LIST IS 2 */
}
```

BEFORE OPTIMIZATION

```
short foo (short x, short y)
{
    short d;

d = x / y;
    return d;
}
```

FIG.6A

AFTER OPTIMIZATION

```
short foo (short x, short y)
{
    short d;

if (y == 17) {
        return ((int)x * 3855) >> 16;
    } else {
        d = x / y;
        return d;
    }
}
```

FIG.6B

METHOD, APPARATUS AND COMPUTER PROGRAM FOR COMPILING PROGRAM USING STATISTICAL INFORMATION ON VARIABLES, AND RECORDING MEDIUM THEREFOR

BACKGROUND OF THE INVENTION

1. Field of the Invention

This invention relates to a compiling method, a compiling apparatus and a compiling program using statistical information on variables, and a recording medium therefor. More specifically, the present invention relates to a compiling method, a compiling apparatus and a compiling program for collecting, with respect to variables in the procedure of the program to be translated, statistical information on the actual values of variables given at the time of execution, and optimizing the procedure by using the statistical information, and a recording medium therefor.

2. Description of the Related Art

Computerized program compiling methods include one by which, during the execution of an object program generated by translating a source program, values actually given to variables in that procedure and their frequencies are recorded as statistical information (hereinafter referred to as "profile information"), and the recorded profile information is utilized for optimizing the procedure in the next and subsequent translation processing (see, for instance, Patent Reference 1: Japanese Patent Application Laid-Open No. 11-149380).

By the method disclosed in Patent Reference 1, a profile record (hereinafter referred to as simply "record") is prepared for each of the variables which are the objects of profiles of individual procedures. Then, by simply preparing a plurality of data structures (hereinafter referred to as "value lists") in the record for storing the set of a value and an assigned frequency for each of the types of value assigned to the variables at the time executing the object program, it is claimed that the values obtained during the execution can be stored in the descending order of frequency. However, Patent Reference 1 describes no details of the processing that is to work in the claimed way.

As far as the description in Patent Reference 1 indicates, the following two implications are conceivable.

1) Implied Method A: First come first registered basis

During the execution of procedures of the target program, values assigned to variables are registered in the order in which the procedures are called and, when the number of types of values has reached that of the value lists of records, no values of a new type that emerges thereafter are registered.

Considered here is a case in which, for instance, that actual value assigned to a variable x at the entrance of a procedure having one argument x:sub(x) is to be recorded. It is supposed that the values assigned to the variable x are as follows when this procedure has been called 10 times.

x={4, 4, 4, 7, 7, 10, 10, 3, 6, 10}

If here the number of the value lists is 3, values are stored in all the value lists of the record at the point of time when a third type of value "10" is given. For this reason, none of the new types of value that subsequently emerge ("3" and "6") is registered. Therefore, the state of the value lists at the time the program is completed will be as follows.

{Value, frequency}={4, 3}, {7, 2}, {10, 3}

2) Implied method B: The value of the lowest frequency of appearance is Discarded when the Value Lists of the Record Have Become Full During the execution of procedures of the target program, values assigned to variables are registered in the order in which the procedures are called; when a new type of value appears in a state in which values are stored in all the value lists of the record, the value of the lowest frequency of appearance by that point of time is excluded, and the new value is registered. If there are a plurality of values of the lowest frequency of appearance, any appropriate one is selected out of them for exclusion.

For instance, it is supposed that the values assigned to the variable x are as follows when the same procedure as that in the case of the above-described conventional method A is called 10 times.

x={4, 4, 4, 7, 7, 10, 3, 6, 8, 8}

If here the number of the value lists is 3, the state of the value lists at the time of the sixth call will be as follows.

{Value, frequency}={4, 3}, {7, 2}, {10, 1}

Then, when it is called the seventh time together with a new value "3", values are already stored in all the value lists. Then the value "10" of the lowest frequency of appearance is excluded out of the value lists, and the new value is registered. The result will be as follows.

{Value, frequency}={4, 3}, {7, 2}, {3, 1}

Further at the eighth call, similarly the value "3" is excluded, and a value "6" is registered instead. At the ninth call, similarly the value "6" is excluded, and a value "8" is registered instead." As a result, the state of the value lists at the end of the program will be as follows.

{Value, frequency}={4, 3}, {7, 2}, {8, 2}

However, the two conventional methods described above respectively involve the following problems.

1) Problem with the implied method A

If values are given in the following sequence and a procedure is called, the value of the highest frequency may not be stored in the value lists of the record.

x={1, 2, 3, 4, 4, 5, 5, 6, 6, 6}

In this case, properly the following sets of value and frequency should be stored in the value lists.

{Value, frequency}={6, 3}, {4, 2}, {5, 2}

However, the actually stored sets will be as follows.

{Value, frequency}={1, 1}, {2, 1}, {3, 1}

2) Problem with the Implied Method B

If values are given in the following sequence and a procedure is called, the value of the highest frequency may not be stored in the value lists of the record.

x={1, 3, 3, 5, 5, 7, 7, 1, 6, 1}

In this case, properly the following sets of value and frequency should be stored in the value lists.

{Value, frequency}={1, 3}, {3, 2}, {7, 2}
or {1, 3}, {3, 2}, {5, 2}

However, the actually stored sets will be as follows.

{Value, frequency}={3, 2}, {5, 2}, {1, 1}
or {7, 2}, {5, 2}, {1, 1}
or {7, 2}, {3, 2}, {1, 1}

Incidentally, what sets of value and frequency are stored in the value lists depends on the choice of the set to be discarded at the time the value lists have become full.

It is seen that, by either of the conventional methods described above, if there are more types of values assigned to variables obtained at the time of procedure execution than the number of value lists, the sets of value and frequency stored in the value lists may be unreliable.

Though not expressly mentioned in Patent Reference 1, the number of value lists should be determined at the time of translation. If the number of value lists is not determined at the time of translation and storage areas for value lists are to be dynamically secured at the time of execution and if the object program itself has processing to dynamically secure storage areas, the procedure may interfere with that processing to exert adverse impacts. For this reason, safe execution is usually impossible except where appropriate storage management is possible on the part of the system as in the virtual machine in the JIT (Just In Time) compiler of JAVA (a registered trademark of Sun Microsystems, Inc. of the U.S.).

Therefore, it is practically impossible to determine before translation the number of value lists to be sufficiently greater than the number of types of values assigned to variables obtained.

SUMMARY OF THE INVENTION

An object of the present invention, therefore, is to provide a compiling method permitting reliable collection, during the execution of a program to be translated in processing program compilation, of profile information on values which are assigned to variables in that procedure and whose frequencies of appearance is 50% or more. Another object of the invention is to provide a compiling method permitting optimization by utilizing the profile information collected by the processing program.

Still another object of the invention is to provide a compiling apparatus for realizing the compiling method, a compiling program for causing a computer to execute compilation by the compiling method, and a recording medium in which the program is recorded.

The present invention provides a method for translating a program stated in a programming language to generate a computer-executable object program using statistical information on variables, the method comprising the steps of 1) adding to a program, during the execution of the program in a first round of program translation, a sequence of instructions for performing statistical processing to record into a record a maximum of two sets of values assigned to variables in the procedure and the frequencies of assignment of the values and another sequence of instructions for primary profile output processing to supply information stored in the record as primary profile information after the end of the execution of the program; 2) storing the primary profile information that has been supplied into a storage unit after the end of the first round of program execution; 3) reading in the primary profile information and setting the values stored in the primary profile information into the record; 4) adding to the program, in a second round of program translation, a sequence of instructions for performing statistical verification processing to record into the record the appearance frequencies of values set in the record and the execution frequency of the procedure including processing to assign the values to variables and another sequence of instructions for performing final profile output processing to supply the appearance frequencies and the execution frequency stored in the record as final profile information after the end of the execution of the program; and 5) storing the final profile information that has been supplied into the storage unit after the end of the second round of program execution.

According to the invention, the following two compiling processes are performed to collect profile information on values whose frequencies of appearance can reach 50% or more, out of values assigned to variables in that procedure during the execution of an object program generated from a source program.

(1) Primary Profile Processing

According to the invention, first, processing to record values whose frequencies of appearance can reach 50% or more, out of values assigned to variables in the procedure of the program to be translated (statistical processing) is inserted into an appropriate position in the program to be translated. Here, as the record in which the result of the statistical processing is to be recorded, a record in which the number of value lists is fixed to 2 is prepared. Then, during the execution of the program to be translated, values which are assigned to variables and whose frequencies of appearance can reach 50% or more are recorded into the record, and the two values recorded in the record are supplied as primary profile information.

The statistical processing to record the values whose frequencies of appearance can reach 50% or more is performed in the same way as the aforesaid method B. Thus, where values are already stored in two value records, if a new type of value appears thereafter, the value of the lowest frequency of appearance by that point of time is excluded from the value list, and the new value is stored. Here it is sufficient to record values whose frequencies of appearance can reach 50% or more in the subsequent statistical verification processing, but no accurate recording of those appearance frequencies is required. It is supposed here, for instance in the case of the aforementioned procedure sub(x), the following values are assigned to an argument x.

$x=\{1, 2, 2, 3, 1, 3, 3, 1, 1, 1\}$

In this case, the following sets are actually stored, and "1" is recorded as a value whose appearance frequencies is 50%.

$\{Value, frequencies\}=\{2, 2\}, \{1, 3\}$ or $\{3, 2\}, \{1, 3\}$

The reason is that, a specific value whose frequencies of appearance can reach 50% or more, even if it becomes temporarily infrequent in appearance during program execution and accordingly excluded from the value list for the time being, will appear at a sufficiently high frequency at some time later in the execution and stored again into the value list without fail, then being entered into a record having two value lists.

However, such statistical processing alone involves the following two problems.

1) The appearance frequency may be unaccurately estimated, i.e. underestimated.
2) Values of less than 50% in appearance frequency may be sometimes registered in the value list.

Therefore, the result of the statistical processing is corrected by the following final profile processing to solve the problems noted above.

(2) Final Profile Processing

According to the invention, 1) processing to measure the frequency of basic block execution including the processing to assign values to variables and 2) processing, where the values assigned to variables were obtained by the statistical processing, to measure the frequencies of their appearance (hereinafter these two steps of processing will be collectively referred to as "statistical verification processing") are inserted into an appropriate position in the program to be translated. The basic block here means a sequence of instructions consisting of one or more instructions, having no branch instruction except at the end of the sequence and having no other destination of branching than the beginning of the sequence.

Hereupon, as the record in which the result of the statistical verification processing is to be recorded, a record in which the number of value lists is fixed to 2, as that used in the statistical processing, is prepared, and the two values stored as primary profile information are set in the value lists of the record. Then, the program is executed under the same conditions as when the program was executed during the primary profile processing, and the appearance frequency of only a value assigned to a variable undergoing the procedure is the same as a value set in a value list of the record ("either 2 or 1" or "either 3 or 1" here) is counted (incremented by 1). Also, a record in which to record the frequencies of procedure calls themselves is provided, and the frequencies of procedure execution is counted (incremented by 1). Then, after the end of execution of the program, final profile information is supplied from records in the record.

Thus, after the final profile processing has been gone through, statistical information (final profile information) can be acquired on any given variable as to:

1) Whether or not there is any value whose frequencies of appearance is 50% or more, and
2) If there is, what (value) it is.

The method for compiling a program according to the invention is further provided with a compiling process whereby: 1) the final profile information is read in; 2) in a third round of program translation, the appearance frequencies of the values are figured out on the basis of the appearance frequencies of the values acquired from the final profile information and the execution frequency of the procedure including the processing to assign the values to variables; and 3) processing to achieve optimization into performing an operation predictable from the values when said appearance frequency is 50% or more.

According to the invention, in the subsequent translation processing, optimization is performed with referencing the final profile information to generate an object program. For instance, the respective appearance frequencies of the two values are figured on the basis of the execution frequency of the procedure of the final profile information and the appearance frequencies of values, and optimization to peculiarize the procedure with respect to values whose appearance frequencies are 50% or more, the procedure involving the variables to which those values are assigned, to perform a predictable operation.

Therefore in the optimization of subsequent translation processing, the object program can be performed higher speed in execution by using this final profile information.

Further according to the invention, there are provided a compiling apparatus for realizing the compiling method described above, a program for causing a computer to execute the compiling method, and a recording medium in which the program is recorded.

According to the invention, in processing by a compiler to translate a source program to generate an object program, when values actually assigned to variables in the procedure of the program to be translated and their frequencies are to be recorded as profile information, the appearance frequency of values assigned to values in the procedure can be estimated without error, and in particular supply profile information reliably recording values whose appearance frequencies are more than 50%.

Therefore, when a program in which the same value is assigned to a variable at a high frequency in the procedure during the execution of the program is to be translated, optimization to peculiarize the procedure into processing to perform an operation that is predictable from a specific value assigned to a variable is made possible, thereby enabling the object program further increased in speed and efficiency to be generated.

The invention can be applied to a usual compiling apparatus for compiling program. The invention is especially suitable for application to a compiling apparatus for generating permit ready referencing of specific values with respect to variables. For instance, it is applicable to a compiling apparatus for generating optimized high speed object programs for controlling built-in equipment items.

More specifically, one type of control devices for automotive components, such as engines and brakes, is often used for a plurality of models or grades. In such a case, the engine type, mounted equipment and body weight often vary from model to model or from grade to grade, and the difference in the object of control may affect the parameters of the equipment control program or typical values of data entered from external sensors. It is difficult, however, to obtain such data in advance by calculation, and figuring out the optimal values based on data acquired by trail runs or the like and having them reflected in the program has inevitably relied on manual work.

Therefore, since the application of the invention to a compiling apparatus enables such optimal values to be automatically reflected in the program and an optimized high speed object program to be acquired, the workload of program development can be alleviated.

BRIEF DESCRIPTION OF THE DRAWINGS

FIGS. 6A and 6B show an example of optimization using final profile information.

DETAILED DESCRIPTION OF THE PREFERRED EMBODIMENTS

As one of the best modes for carrying it out, the present invention has been implemented using a compiling apparatus by which processing to translate a source program is augmented with processing to record profile information on values actually assigned to variables in a procedure under execution at the time of translation, that profile information is collected and supplied during the execution of an object program, and optimization is performed by utilizing the profile information so supplied.

Figure 1:
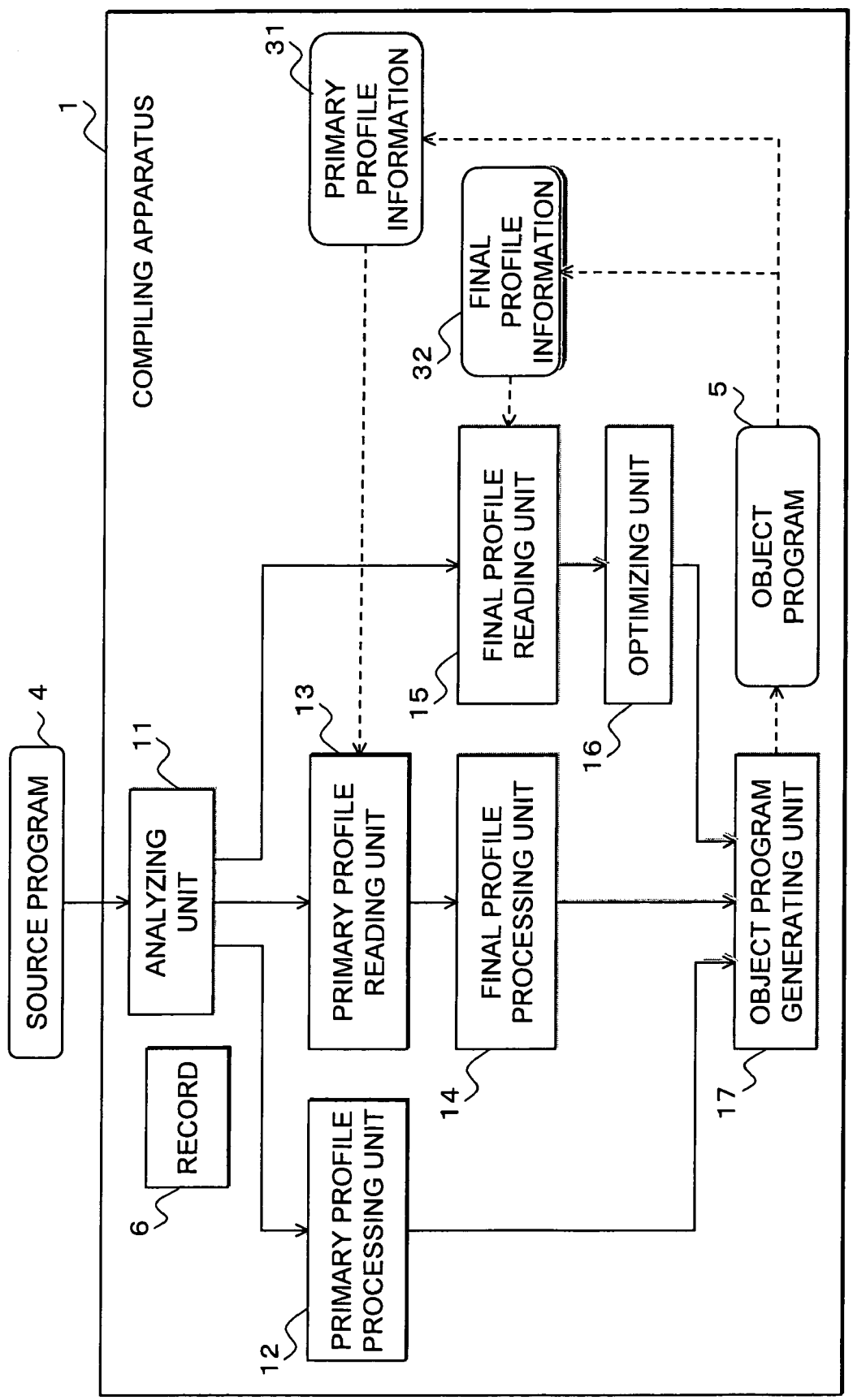
FIG. 1 shows an example of configuration of a preferred embodiment of the present invention.

FIG. 1 shows an example of configuration of a preferred embodiment of the present invention.

A compiling apparatus 1 comprises an analyzing unit 11, a primary profile processing unit 12, a primary profile reading unit 13, a final profile processing unit 14, a final profile reading unit 15, an optimizing unit 16, and an object program generating unit 17.

The analyzing unit 11 is processing means for reading into it a source program 4 to be translated, analyzing the syntax and data and generating data of an intermediate form (e.g. intermediate object module, hereinafter the data of intermediate form will be referred to the intermediate data) from the source program.

The primary profile processing unit 12 is processing means for embedding into prescribed positions in the intermediate data a sequence of instructions for performing statistical processing to record into a record 6 values whose frequencies of appearance can reach 50% or more, out of values which are assigned to variables in the procedure during the execution of an object program 5, and another sequence of instructions for performing processing to put together the contents of the record 6 after the end of execution and supply them as a file of primary profile information 31.

The primary profile reading unit 13 is processing means for reading the primary profile information 31 in.

The final profile processing unit 14 is processing means for embedding into prescribed positions in, the intermediate data a sequence of instructions for performing statistical verification processing to measure the frequencies of executions of basic blocks including processing to assign values to variables in the object program 5 and the appearance frequencies of values which are assigned to variables and stored in the primary profile information 31 and another sequence of instructions for performing processing to put together the contents of the record 6 after the end of execution and supply them as a file of final profile information 32.

The final profile reading unit 15 is processing means for reading the final profile information 32 in and figuring out the appearance frequency of each of two values assigned to variables set in the final profile information 32.

The optimizing unit 16 is processing means for performing optimization, by referencing the final profile information 32, with respect to values whose frequencies of appearance are 50% or more out of the values assigned to variables in the procedure during execution, so as to cause predictable operations to take place according to those values.

The object program generating unit 17 is processing means for generating the object program 5 from the intermediate data.

The object program 5 supplies a file of either the primary profile information 31 or the final profile information 32 after the end of execution.

Figure 2:
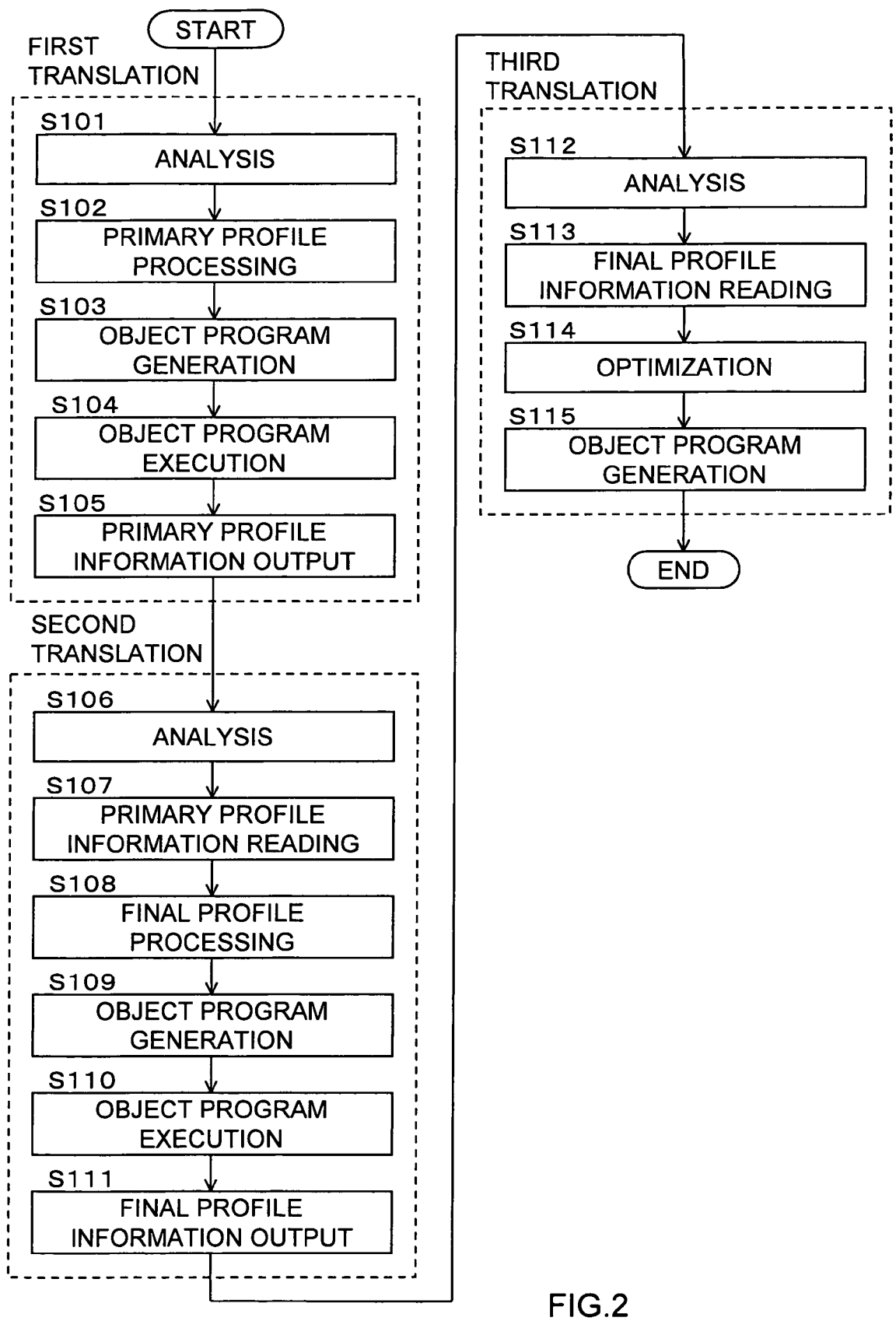
FIG. 2 shows a processing flow according to the invention.

FIG. 2 shows a processing flow according to the invention.

The compiling apparatus 1 performs three rounds of translation processing on the source program 4, and generates an object program 5 optimized by the final round of translation processing.

To perform the first round of translation processing, the compiling apparatus 1 receives an instruction to implement the primary profile processing unit 12 and is thereby actuated.

The compiling apparatus 1, with its analyzing unit 11, reads the source program 4 in, analyzes the syntax and data as required, and thereby converts the source program 4 into an intermediate data. In this operation, it assigns a unique number to every basic block and variable in the source program 4 (step S101).

Next, the primary profile processing unit 12 performs the processes as stated below to each of the variables on which profile information is designated to be obtained (step S102).

First, the primary profile processing unit 12 creates the record 6 for that variable in the data portion of the intermediate data. Then the primary profile processing unit 12 sets a basic block number column and a variables number column in the record 6, and inserts a sequence of instructions for statistical processing immediately after the definition point of the pertinent variable in the intermediate data.

Figures 3A, 3B:
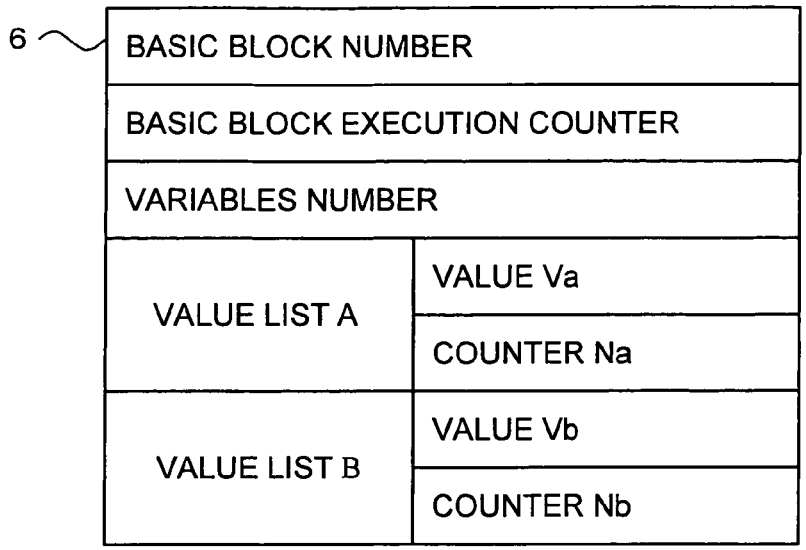
FIGS. 3A and 3B show examples of configuration of a record.

FIG. 3A shows an example of configuration of the record 6.

The record 6 is composed of a basic block number for which a number unique to the basic block is set, a basic block execution counter on which the number of times the basic block has been executed is set, a variables number unique to the variable is set, and two value lists A and B having two counter N items in which are set the appearance frequencies of values Va and Vb, for which values to be assigned to the pertinent variables are set in the basic block during the execution of the program. FIG. 3B shows an example of statement in the C programming language of a data structure of the record 6 shown in FIG. 3A.

After that, the object program generating unit 17 generates the object program 5 from the intermediate data (step S103). Further, that object program 5 is tentatively executed manually (step S104).

During the execution of the object program 5, the following statistical processing is performed in accordance with the sequence of instructions inserted by the processing at step S102.

Figure 4:
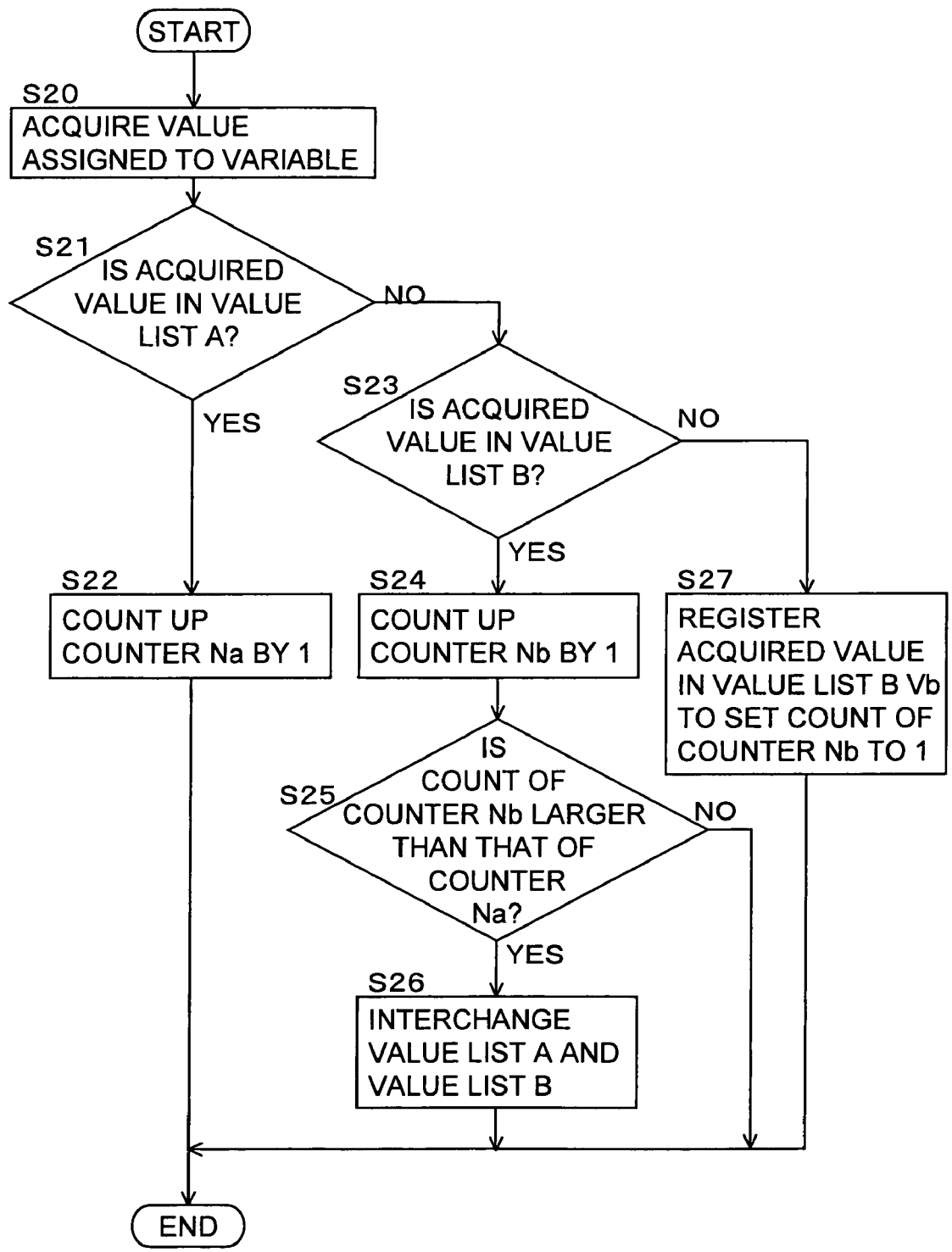
FIG. 4 shows a flow of statistical processing in accordance with an inserted sequence of instructions.

FIG. 4 shows the flow of statistical processing.

First, a value assigned to the variable during the execution of the object program 5 is acquired (step S20). Then, it is determined whether or not the acquired value is in the value list A of the record 6 (step S21). If the acquired value is the same as a value Va in the value list A of the record 6, the counter Na will be counted up by 1 (step S22). On the other hand, if the acquired value is not found in the value list A, it will be determined whether or not that value is in the value list B of the record 6 (step S23). If that value is in the value list B of the record 6, i.e. if the acquired value is the same as a value Vb in the value list B, the counter Nb will be counted up by 1 (step S24). Further, it is determined whether or not the count of the counter Nb is larger than the count of the counter Na (step S25). If the count of the counter Nb is found larger than that of the counter Na, the value list A and the value list B will be interchanged with each other (step S26).

Of if, in the processing at step S23, that value is not found in the value list B of the record 6, the acquired value will be registered as a value Vb in the value list B, and the count of the counter Nb will be set to 1 (step S27).

After the of execution, values recorded in the record 6 are put together, and supplied as a file of the primary profile information 31 (step S105).

In this way, values which are assigned to variables in the procedure under execution and whose frequencies of appearance can be 50% or more are stored as the primary profile information 31.

Then, to perform the second round of translation processing, the compiling apparatus 1 receives an instruction to implement the primary profile reading unit 13 and the final profile processing unit 14, and is thereby actuated.

First, the analyzing unit 11 reads in the source program 4 to be translated, analyzes the syntax and data as required as in the processing at step S101, and converts it into a data of the intermediate form. In this operation, it assigns a unique number to every basic block and variable in the program (step S106).

Next, the primary profile reading unit 13 reads the primary profile information 31 in and set the two stored values in the record 6 (step S107).

Further, the final profile processing unit 14 performs the processes as stated below to each of the variables on which profile information is designated to be obtained (step S108).

First, the final profile processing unit 14 sets the record 6 for that variable in the data portion of the intermediate data. Incidentally, the record 6 is of the same data structure as what was used in the statistical processing described above. Then the final profile processing unit 14 assigns a basic block number column and a variables number column in the record 6, and sets the two values obtained from the primary in the value lists A and B, respectively. Further the final profile processing unit 14 inserts a sequence of instructions for statistical verification processing immediately after the definition point of the pertinent variable in the intermediate data.

After that, the object program generating unit 17 generates the object program 5 from the intermediate data (step S109). Further, that object program 5 is tentatively executed manually (step S110). During the execution of the object program 5, the following statistical verification processing is performed in accordance with the sequence of instructions inserted by the processing at step S108.

Figure 5:
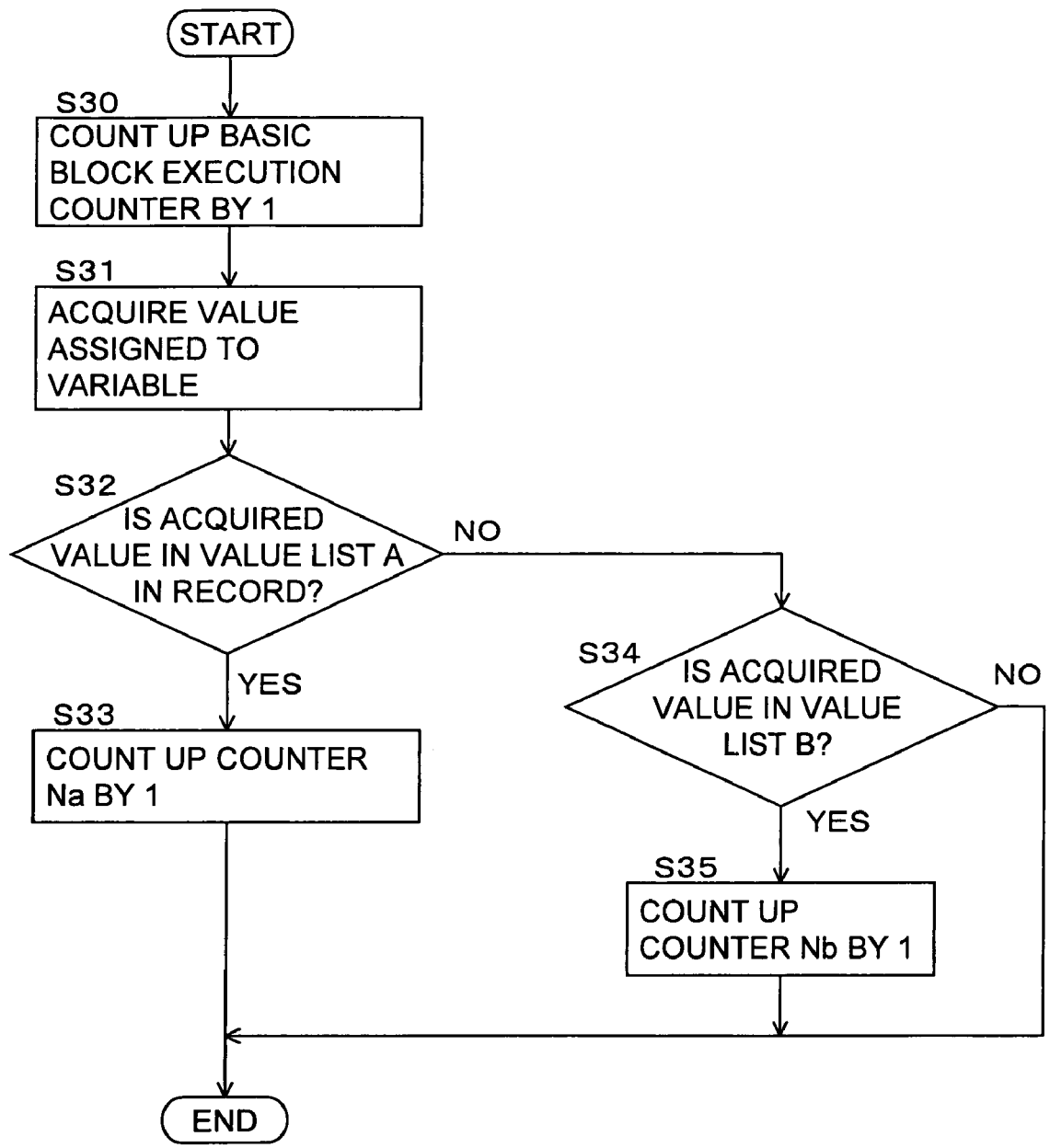
FIG. 5 shows a flow of statistical verification processing in accordance with the inserted sequence of instructions.

FIG. 5 shows a flow of statistical verification processing in accordance with the inserted sequence of instructions.

First the basic block execution counter is counted up by 1 (step S30). Then, a value assigned to the variable in the procedure during the execution is acquired (step S31). It is determined whether or not the acquired value is found in the value list A of the record 6 (step S32). If the acquired value is the same as a value Va in the value list A of the record 6, the counter Na will be counted up by 1 (step S33).

On the other hand, if the acquired value is not found in the value list A, it will be determined whether or not that value is in the value list B of the record 6 (step S34). If that value is in the value list B of the record 6, i.e. if the acquired value is the same as a value Vb in the value list B, the counter Nb will be counted up by 1 (step S35).

After the end of the execution, values recorded in the record 6 are put together, and supplied as a file of the final profile information 32 (step S111).

In this way, the appearance frequencies of the two values extracted by statistical processing and the number of times the procedure involving the variable to which the value is assigned has been executed are stored as the final profile information 32.

Then, to perform the third round of translation processing, the compiling apparatus 1 receives an instruction to implement the final profile reading unit 15 and the optimizing unit 16, and is thereby actuated.

First, the analyzing unit 11 reads in the source program 4 to be translated, analyzes the syntax and data as required as in the processing at step S101, and converts it into a data of the intermediate form. In this operation, the analyzing unit 11 assigns a unique number to every basic block and variable in the program (step S112).

Next, the final profile reading unit 15 reads in the final profile information 32, divides the counts of the respective execution counters (Na or Nb) by the basic block execution counter with respect to the values in the value lists A and B set by the statistical verification processing, and thereby figures out the appearance frequencies of the respective values (step S113). And if any value in either the value list A or the value list B is found to have an appearance frequency of 50% or more, the optimizing unit 16 performs optimization utilizing that value (step S114). Then, the object program generating unit 17 generates the object program 5 (step S115).

FIG. 6 shows an example of optimization using the final profile information 32.

FIG. 6A shows a certain part of the source program 4 before optimization. A function foo stated in the part of the source program 4 takes two integral arguments and returns their quotient. It is supposed here, for instance, that the final profile reading unit 15 references the final profile information 32 and finds that the value that can be taken by a variable y of the function foo is "17" with a probability of 50% or more.

The optimizing unit 16 differentiates its operation, with respect to the function foo, between a case in which a value=17 is assigned the variable y highly frequently and cases of different values from 17, and performs optimization to raise the processing speed by handling the highly frequent value as a fixed one.

FIG. 6B shows the part of the object program 5 shown in FIG. 6A generated under optimization, the part being expressed in the form of statement for the source program 4 in order to secure its readability and making evident the advantage of the present invention. As shown in FIG. 6B, the processing of the variable y where its value is 17 and whose appearance frequency is 50% or more in this procedure is increased in speed compared with the processing before optimization.

By optimizing in such a peculiarizing way a value assigned to the variable at a high appearance frequency of (50% or more), the overall procedure involving that variable can be increased in speed. As an eventuality, the object program 5 that is generated can be increased in speed and efficiency.

Whereas the present invention has been described with reference to a particular mode of implementation, obviously the invention can be modified in many different ways without deviating from its true scope and spirit.

For instance, in the processing of step S113, the processing of division to figure out the appearance frequency of the value in the record 6 set on the basis of the primary profile information 31 can as well be inserted in the processing at step S111 into the object program 5 together with the result of statistical verification processing for combined processing, and recorded into the final profile information 32. In this case, the final profile processing unit 14 embeds into the intermediate data the aforementioned sequence of instructions for division processing to figure out the frequency of appearance.

Also, the statistical processing and the statistical verification processing may as well be applied to any desired variable contained in the source program 4. In this case, information on variables to be covered by the statistical information is given to the compiling apparatus 1 before the start of the statistical processing. Incidentally, the variables to be covered by the statistical information can be set by the user as desired.

Further, the invention can be implemented as a compiling program that can be read and executed by a computer. The program to cause a computer to execute processing according to the invention can be stored in a suitable recording medium, such as a computer-readable portable memory, semiconductor memory or hard disk, and provided in the form of being recorded in such a recording medium.

What is claimed is:

1. A method for translating a program stated in a programming language to generate a computer-executable object program using statistical information on variables, the method comprising the steps of:

adding to a program, during the execution of the program in a first round of program translation, a sequence of instructions for performing statistical processing to record values assigned to variables in the procedure and the frequencies of assignment of the values into a record in which a maximum number of values to be recorded is fixed and another sequence of instructions for primary profile output processing to supply information stored in the record as primary profile information after the end of the execution of the program;

wherein when a number of values assigned to the variables is larger than a number of items in the record, if a value assigned to the variables has been registered into the record, a registration number of a value being registered into the record is incremented by one and if the value assigned to the variables has not been registered into the record, a value having a least registration number in the record is cleared and said value assigned to the variables is newly registered into the record with registration number one;

storing the primary profile information that has been supplied into a storage unit after the end of the first round of program execution;

reading in the primary profile information and setting the values stored in the primary profile information into the record;

adding to the program, in a second round of program translation, a sequence of instructions for performing statistical verification processing to record into the record the appearance frequencies of values set in the record and the execution frequency of the procedure including processing to assign the values to variables and another sequence of instructions for performing final profile output processing to supply the appearance frequencies and the execution frequency stored in the record as final profile information after the end of the execution of the program; and storing the final profile information that has been supplied into the storage unit after the end of the second round of program execution.

2. The method according to claim 1, further comprising the steps of:

reading the final profile information in;

calculating, in a third round of program translation, the appearance frequencies of the values on the basis of the appearance frequencies of the values acquired from the final profile information and the execution frequency of the procedure including the processing to assign the values to variables; and processing to achieve optimization into performing an operation predictable from the values when the appearance frequencies are 50% or more.

3. An apparatus for translating a program stated in a programming language to generate a computer-executable object program using statistical information on variables, the apparatus comprising:

a storage unit for storing profile information;

processing means for adding to a program, during the execution of the program in a first round of program translation, a sequence of instructions for performing statistical processing to record values assigned to variables in the procedure and the frequencies of assignment of the values into a record in which a maximum number of values to be recorded is fixed and another sequence of instructions for primary profile output processing to supply information stored in the record as primary profile information after the end of the execution of the program;

wherein when a number of values assigned to the variables is larger than a number of items in the record, if a value assigned to the variables has been registered into the record, a registration number of a value being registered into the record is incremented by one and if the value assigned to the variables has not been registered into the record, a value having a least registration number in the record is cleared and said value assigned to the variables is newly registered into the record with registration number one;

processing means for storing the primary profile information that has been supplied into a storage unit after the end of the first round of program execution;

processing means for reading in the primary profile information and setting the values stored in the primary profile information into the record;

processing means for adding to the program, in a second round of program translation, a sequence of instructions for performing statistical verification processing to record into the record the appearance frequencies of values set in the record and the execution frequency of the procedure including processing to assign the values to variables and another sequence of instructions for performing final profile output processing to supply the appearance frequencies and the execution frequency stored in the record as final profile information after the end of the execution of the program; and processing means for storing the final profile information that has been supplied into the storage unit after the end of the second round of program execution.

4. The apparatus according to claim 3, further comprising:

processing means for reading the final profile information in;

processing means for calculating, in a third round of program translation, the appearance frequencies of the values on the basis of the appearance frequencies of the values acquired from the final profile information and the execution frequency of the procedure including the processing to assign the values to variables; and processing means for achieving optimization into performing an operation predictable from the values when the appearance frequencies are 50% or more.

5. A recording medium storing a computer program for translating a source program stated in a programming language using statistical information on variables to generate an object program, the program causes the computer to execute processing:

to add to a program, during the execution of the program in a first round of program translation, a sequence of instructions for performing statistical processing to record values assigned to variables in the procedure and the frequencies of assignment of the values into a record in which a maximum number of values to be recorded is fixed and another sequence of instructions for primary profile output processing to supply information stored in the record as primary profile information after the end of the execution of the program;

wherein when a number of values assigned to the variables is larger than a number of items in the record, if a value assigned to the variables has been registered into the record, a registration number of a value being registered into the record is incremented by one and if the value assigned to the variables has not been registered into the record, a value having a least registration number in the record is cleared and said value assigned to the variables is newly registered into the record with registration number one;

to store the primary profile information that has been supplied into a storage unit after the end of the first round of program execution;

to read in the primary profile information and setting the values stored in the primary profile information into the record;

to add to the program, in a second round of program translation, a sequence of instructions for performing statistical verification processing to record into the record the appearance frequencies of values set in the record and the execution frequency of the procedure including processing to assign the values to variables and another sequence of instructions for performing final profile output processing to supply the appearance frequencies and the execution frequency stored in the record as final profile information after the end of the execution of the program; and to store the final profile information that has been supplied into the storage unit after the end of the second round of program execution.

6. The recording medium storing the computer program according to claim 5, the program causes the computer to execute further processing:

to read the final profile information in:

to calculate, in a third round of program translation, the appearance frequencies of the values on the basis of the appearance frequencies of the values acquired from said final profile information and the execution frequency of the procedure including the processing to assign the values to variables; and to achieve optimization into performing an operation predictable from the values when the appearance frequencies are 50% or more.

* * * * *